(12) United States Patent
Haddock et al.

(10) Patent No.: US 7,184,244 B1
(45) Date of Patent: Feb. 27, 2007

(54) METHOD FOR FLYING A DISK DRIVE SLIDER HAVING A HIGH PRESSURE MICROPAD ABS

(75) Inventors: Quinn J. Haddock, Longmont, CO (US); Daniel R. Ohlsen, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 393 days.

(21) Appl. No.: 10/822,922

(22) Filed: Apr. 13, 2004

Related U.S. Application Data (62) Division of application No. 10/025,128, filed on Dec. 19, 2001.

(60) Provisional application No. 60/257,122, filed on Dec. 20, 2000.

(51) Int. Cl.
*G11B 5/60* (2006.01)

(52) U.S. Cl. .................. 360/235.7; 360/236.3

(58) Field of Classification Search ............. 360/235.7, 360/236.3
See application file for complete search history.

(56) References Cited

U.S. PATENT DOCUMENTS

| | | | |
|---|---|---|---|
| 3,488,648 A | 1/1970 | Church ................... 340/174.1 |
| 5,404,256 A | 4/1995 | White ..................... 360/236.3 |
| 5,508,862 A | 4/1996 | Lazzari et al. ............... 360/103 |
| 5,768,055 A | 6/1998 | Tian et al. ................ 360/235.2 |
| 6,144,528 A | 11/2000 | Anaya-Dufresne et al. ...... 360/235.4 |
| 6,157,519 A * | 12/2000 | Kohira et al. ................ 360/245 |
| 6,229,672 B1 | 5/2001 | Lee et al. ................. 360/236.8 |
| 6,333,835 B1 | 12/2001 | Kang et al. .............. 360/235.4 |
| 6,421,205 B1 | 7/2002 | Dorius et al. ............ 360/236.5 |
| 6,424,494 B1 | 7/2002 | Koishi ...................... 360/235.6 |
| 6,483,667 B1 | 11/2002 | Berg et al. ............... 360/235.6 |
| 6,556,381 B2 | 4/2003 | Kohira et al. ............. 360/236.3 |
| 6,744,600 B2 * | 6/2004 | Kohira et al. ............. 360/236.3 |
| 6,985,333 B1 * | 1/2006 | Hiller et al. ............. 360/235.5 |
| 2002/0001157 A1 | 1/2002 | Kang et al. .............. 360/236.3 |
| 2003/0058572 A1 * | 3/2003 | Kant et al. ................ 360/97.01 |

* cited by examiner

*Primary Examiner*—Brain E. Miller
(74) *Attorney, Agent, or Firm*—Marsh Fischmann & Breyfogle LLP (57) ABSTRACT

A slider for a disk drive is disclosed. In one embodiment, the slider includes an air bearing pad that contains a read/write transducer. This particular air bearing pad is small. High pressures are exerted on this small air bearing pad while the slider is flying in vertically spaced to its corresponding data storage disk. Pressures in excess of 500 psi may exist on this air bearing pad. In any case, this air bearing pad provides a significant portion of the total lifting forces for flying the slider in vertically spaced relation to its corresponding data storage disk or the like. As such, any expansion of the air bearing pad toward the data storage disk during read/write operations does not result in any significant loss of fly height.

8 Claims, 9 Drawing Sheets

METHOD FOR FLYING A DISK DRIVE SLIDER HAVING A HIGH PRESSURE MICROPAD ABS

CROSS-REFERENCE TO RELATED APPLICATIONS

This patent application is a divisional of and claims priority under 35 U.S.C. § 120 to U.S. patent application Ser. No. 10/025,128, that was filed on Dec. 19, 2001, and that is entitled "Disk Drive Slider With High Pressure Micropad ABS, and further claims priority from U.S. Patent Application Ser. No. 60/257,122, that was filed on Dec. 20, 2000, and that is entitled a "High Pressure Micropad Air-Bearing Design." The entire disclosure of both U.S. Patent Application Ser. No. 60/257,122 and U.S. patent application Ser. No. 10/025,128 is incorporated by reference herein.

FIELD OF THE INVENTION

The present invention generally relates to sliders for disk drives and, more particularly, to forming a read/write transducer within a small air bearing pad so as to reduce the effects that temperature increases from writing operations have on the fly height of the slider.

BACKGROUND OF THE INVENTION

The track density on data storage disks continues to increase. Typically these tracks are circular and are concentrically disposed on a data storage disk of a disk drive. Data may be stored within these tracks via a read/write head of the disk drive. One type of disk drive mounts the read/write head on a slider that flies on what is commonly referred to as an air bearing. This air bearing is a thin boundary layer of air that is carried by the rotating data storage disk. The surface of the slider that projects toward its corresponding data storage disk is configured with one or more air bearing surfaces that compress this boundary layer of air. Compression of the boundary layer of air exerts increased pressure on the slider that results in a sufficient resultant lifting force on the slider, that in turn allows it to remain in vertically spaced relation to its corresponding data storage disk during its rotation.

It is generally desirable to reduce the fly height of the slider above its corresponding data storage disk to improve the signal transfer between the head and this data storage disk. This is becoming more important as the track density on the data storage disks continues to increase (e.g., to make sure the head is communicating with the desired/required track). There are many factors to consider in relation to designing the air bearing surfaces on the slider, or more generally the design of the disk drive. For instance, the linear velocity component of the boundary layer of air on the disk obviously increases as the distance from the disk's center of rotation increases. It is desirable for the fly height of the slider to remain within a certain tolerance, regardless of its radial position relative to its corresponding disk. Another consideration is that the part of the slider that carries the head will typically increase in temperature during read/write operations. This may cause this portion of the slider to expand or protrude toward the corresponding disk, i.e. to undergo pole tip protrusion. Pole tip protrusion typically has an adverse affect on one or more flight characteristics of the slider, including typically a reduction in the fly height of the slider. If the fly height for the slider is designed to be sufficiently "low," pole tip protrusion may cause undesired contact with the corresponding data storage disk. It would be desirable to have a slider design that compensated for pole tip protrusion during read/write operations in a manner that did not significantly adversely affect the fly height of the slider.

BRIEF SUMMARY OF THE INVENTION

A first aspect of the present invention is embodied in a slider for any appropriate type of disk drive. The slider may be characterized as extending at least generally along a first reference axis. Principally, the first reference axis may be used to describe various parts of the slider. For instance, the term "longitudinal" or the like means at least generally along or parallel to this first reference axis, while the term "lateral" or the like means extending at least generally across this first reference axis.

The slider of the first aspect includes a slider body, which in turn has an upper surface and a lower surface which projects toward a data storage disk when the slider is incorporated into a disk drive. Air that is being carried by a rotating data storage disk during operation of a disk drive that incorporates the slider of the first aspect first encounters a leading edge of the slider body. Disposed on the opposite end of the slider body from the leading edge is a trailing edge. A pair of slider body sides extend between and interconnect the leading and trailing edges. Therefore, the leading and trailing edges may be characterized as being at least generally laterally extending and longitudinally spaced, while the slider body sides may be characterized as being at least generally longitudinally extending and laterally spaced. In this case, the distance between the leading and trailing edges would define the length dimension for the slider body, while the distance between the slider body sides would define the width dimension for the slider body.

The lower surface of the slider body of the slider of the first aspect is contoured to allow the slider to fly during operation of a disk drive that incorporates the slider of the first aspect. "Fly" means to be disposed in vertically spaced relation to the corresponding data storage disk. This lower surface includes what may be characterized as a first air bearing pad, or a structure with a surface on which lifting force may be exerted so as to dispose the slider in vertically spaced relation to its corresponding data storage disk during operation of a disk drive that incorporates the slider of the first aspect. This first air bearing pad is small and includes any appropriate transducer for exchanging signals with its corresponding data storage disk (e.g., a read/write head). Consider that the total area of the lower surface of the slider body to be that area which is bounded by the leading edge, trailing edge, and the two slider body sides (e.g., the "length" times the "width" of the slider body for a rectangular or square slider). Stated another way, the total area of the lower surface of the slider body is the area of a projection of the lower surface of the slider body onto a reference plane. The ratio of the area of the air bearing surface of the first air bearing pad to this total area of the lower surface of the slider body is no more than about 0.004 in the case of the first aspect. A principal advantage of the slider of the first aspect is that incorporating the transducer within this small first air bearing pad significantly reduces the effects of pole tip protrusion (e.g., from read/write operations) on the fly height of the slider.

Various refinements exist of the features noted in relation to the first aspect of the present invention. Further features may also be incorporated in the first aspect of the present invention as well. These refinements and additional features may exist individually or in any combination. Another way of characterizing the size of the first air bearing pad of the first aspect (which again carries the transducer) is that at least a substantial portion of the first air bearing pad, and more preferably the entirety of the first air bearing pad, protrudes toward the corresponding data storage disk during read/write operations (or while the transducer is otherwise involved in some "signaling" operation). As such, since the first air bearing pad defines an air bearing surface, and since at least a substantial portion of this air bearing surface will protrude toward the corresponding data storage disk during read/write operations, the loss in fly height due to pole tip protrusion is significantly less compared to the case where the transducer is mounted within an air bearing pad that is sized such that only part of the air bearing pad protrudes toward the disk during read/write operations.

The first air bearing pad of the first aspect may be disposed at least generally toward the trailing edge of the slider of the first aspect. Consider the case where the slider is disposed at a pitch angle relative to its corresponding data storage disk (when the slider of the first aspect is incorporated in a disk drive) such that its leading edge is disposed further from this data storage disk than its trailing edge during disk drive operations. Positioning the transducer in the first air bearing pad in this case thereby reduces the distance between the transducer and the data storage disk to improve upon the exchange of signals therebetween during disk drive operations. In one embodiment, the first air bearing pad is disposed within about 0.0005 inches of the trailing edge of the slider, and thereby including being positioned at the trailing edge of the slider. In another embodiment, the first air bearing pad is disposed within about 0.002 inches of the trailing edge of the slider, and thereby including being positioned at the trailing edge of the slider.

In one embodiment, the surface area of the air bearing surface of the first air bearing pad of the slider of the first aspect is no more than about 0.00001 in$^2$. The actual surface area of the air bearing surface of the first air bearing pad will of course likely depend upon the size of the slider body and possibly other factors. Another way of characterizing the first air bearing pad is the amount of uplifting forces that are exerted on this first air bearing pad during operation of a disk drive that incorporates the slider of the first aspect. In one embodiment, at least about 15 percent of the total uplifting forces that are exerted on the lower surface of the slider body, during operation of a disk drive that incorporates the slider of the first aspect, are exerted on the first air bearing pad. Yet another way of characterizing the first air bearing pad is the pressure that is exerted on the first air bearing pad during operation of a disk drive that incorporates the slider of the first aspect. Pressures of at least about 400 pounds per square inch (psi) in one embodiment, and about 500 psi in another embodiment, are exerted on the first air bearing pad during operation of a disk drive that incorporates the slider of the first aspect. In another embodiment, the maximum pressure that is exerted on the first air bearing pad during operation of a disk drive that incorporates the slider of the first aspect is at least about 1,000 percent greater than any other pressure that is exerted on any other portion of the lower surface of the slider body during disk drive operations. Based upon these characterizations of the first air bearing pad in relation to uplift forces and/or pressures, the first air bearing pad may be characterized as a primary air bearing surface for the slider of the first aspect.

In one embodiment of the first aspect, the first air bearing pad is the "lowest" portion of the lower surface. Stated another way, the first air bearing pad is the structure on the lower surface of the slider body that is disposed the furthest distance from the upper surface of the slider body. However, it may still be desirable for other air bearing surfaces to be included on the lower surface of the slider body. In one embodiment where the first air bearing pad is disposed at least generally toward the trailing edge of the slider and further disposed on a centrally disposed (in the lateral dimension) first reference axis, a pair of air bearing pads may be disposed on opposite sides of the first air bearing pad and at least generally toward the trailing edge for enhancing the roll stiffness of the slider. These air bearing pads preferably would have air bearing surfaces that are recessed relative to the air bearing surface of the first air bearing pad. Other air bearing surfaces that are displaced from that provided by the first air bearing pad could be included on the lower surface of the slider body and for any desired purpose.

Air that is carried by a data storage disk is compressed to exert an uplifting force on the first air bearing pad during operation of a disk drive that incorporates the slider of the first aspect. In this regard, a first pressurizing step may be disposed immediately in front of the first air bearing pad in the direction of the leading edge of the slider. In one embodiment, this first pressurizing step is recessed a distance that is within a range of about 0.5 microinches to about 3 microinches from the air bearing surface of this first air bearing pad (i.e., disposed closer to the upper surface of the slider body), and more preferably a distance of about 1.5 microinches. This first pressurizing step may also function as an air bearing surface for the slider of the first aspect. In this regard, a second pressurizing step may be disposed immediately in front of the first pressurizing step in the direction of the leading edge. In one embodiment, this second pressurizing step is recessed a distance that is within a range of about 3 microinches to about 8 microinches from the air bearing surface of the first air bearing pad (i.e., disposed closer to the upper surface of the slider body), and more preferably a distance of about 5 microinches.

Preferably the slider of the first aspect is configured so as to allow for the manufacture of the slider by conventional semiconductor processing techniques. In this regard, the lower surface of the slider body may be defined by multiple surfaces that are formed in one of two orientations, namely either "horizontal" or "vertical". The air bearing surface of the first air bearing and its associated pressurizing step(s) would be disposed within the horizontal dimension, while an interconnecting surface may be disposed within the vertical dimension. Moreover, preferably each discrete surface on the lower surface of the slider body is continuous, or more specifically does not include any depressions, bores, through holes, or the like which may adversely affect the airflow characteristics over the lower surface of the slider body.

Forces other than the above-noted uplifting forces may be exerted on the slider of the first aspect when incorporated into a disk drive. For instance, the slider of the first aspect may be mounted on a free end or other deflectable portion of a load beam or suspension that is biased toward its corresponding data storage disk (e.g., using a spring or spring-like force in the construction of the slider). This suspension would be attached to a rigid actuator arm or actuator arm tip of the disk drive, that in turn would be movably interconnected with a base plate and/or cover of the disk drive to allow the actuator arm to position the slider at the desired radial position on its corresponding data storage disk for read/write operations. Another force that may direct the slider of the first aspect toward its corresponding data storage disk when incorporated into a disk drive may be provided by a negative pressure or "suction" cavity that may be formed on the lower surface of the slider body. Such a cavity may be formed by recessing a base of the cavity a sufficient distance from the air bearing surface of the first air bearing pad a sufficient distance (e.g., at least about 40 microinches, and in one embodiment about 50 microinches). In any case, relative movement between the air carried by the rotating data storage disk and the lower surface of the slider of the first aspect creates a negative pressure within this relatively "deep" cavity so as to exert a biasing force on the slider body that is in the direction of its corresponding data storage disk.

A second aspect of the present invention is embodied in a slider for any appropriate type of disk drive. The slider may be characterized as extending at least generally along a first reference axis of the type noted above in relation to the first aspect. The slider of the second aspect includes a slider body, which in turn has an upper surface and a lower surface which projects toward a data storage disk when the slider is incorporated into a disk drive. Air that is being carried by a rotating data storage disk during operation of a disk drive that incorporates the slider of the second aspect first encounters a leading edge of the slider body. Disposed on the opposite end of the slider body from the leading edge is a trailing edge. A pair of slider body sides extend between and interconnect the leading and trailing edges. Therefore, the leading and trailing edges may be characterized as being at least generally laterally extending and longitudinally spaced, while the slider body sides may be characterized as being at least generally longitudinally extending and laterally spaced. In this case, the distance between the leading and trailing edges would define the length dimension for the slider body, while the distance between the slider body sides would define the width dimension for the slider body.

The lower surface of the slider body of the slider of the second aspect is contoured to allow the slider to control the fly height of the slider when incorporated into a disk drive. This lower surface includes a first air bearing pad, or a structure with a surface on which a lifting force may be exerted so as to move the slider at least generally away from its corresponding data storage disk during operation of a disk drive that incorporates the slider of the second aspect. Pressurization of the air that is carried by a rotating data storage disk of a disk drive that incorporates a slider of the second aspect is provided by a first pressurizing step that is both recessed relative to the first air bearing pad, and further that is disposed immediately in front of the first air bearing pad in the direction of the leading edge of the slider body. An appropriate transducer is mounted within (i.e., embedded within) the first air bearing pad. The size of the first air bearing pad is selected such that at least a substantial portion of the first air bearing pad, and more preferably the entirety of the first air bearing pad, protrudes toward a corresponding data storage disk during read/write operations (or while the transducer is otherwise involved in some "signaling" operation) when the slider of the second aspect is incorporated into a disk drive. As such, since the first air bearing pad defines an air bearing surface, and since at least a substantial portion of this air bearing surface will protrude toward the corresponding data storage disk during read/write operations, the loss in fly height due to pole tip protrusion is significantly less compared to the case where the transducer is mounted within an air bearing pad that is sized such that only part of the air bearing pad would extend toward the disk during read/write operations.

Various refinements exist of the features noted in relation to the second aspect of the present invention. Further features may also be incorporated in the second aspect of the present invention as well. These refinements and additional features may exist individually or in any combination. In one embodiment, the first air bearing pad of the slider of the second aspect is the same structure as the first air bearing pad discussed above in relation to the first aspect. Therefore, the various features that were discussed above in relation to the first aspect may be utilized by the second aspect, alone or in any combination.

A third aspect of the present invention is embodied by a method for flying a slider relative to an appropriate data storage medium, which will be described herein as a rotating disk. Other data storage mediums may be utilized. The slider associated with this third aspect includes a first air bearing pad and an appropriate transducer. The slider flies above this disk by pressurizing a fluid that exists between the slider and the rotating disk. This pressurization results in a pressure being exerted on this first air bearing pad that is at least about 400 pounds per square inch.

Various refinements exist of the features noted in relation to the third aspect of the present invention. Further features may also be incorporated in the third aspect of the present invention as well. These refinements and additional features may exist individually or in any combination. In one embodiment, the transducer is a formed in or is part of the first air bearing pad. When a signal is directed to this transducer, the first air bearing pad expands in the direction of its corresponding data storage disk. This expansion (commonly referred to as a "pole tip protrusion") does not have a significant adverse effect on the fly height of the slider. In one embodiment, this loss in fly height is no more than about 20 percent of the fly height at a time when a signal is not been directed to the transducer, and more preferably no more than about 10%. One way in which the noted pressure may be realized on the first air bearing pad of this third aspect, so as to make the slider more insensitive to the effects of an increase in temperature while a signal is being directed to the transducer, is to configure the first air bearing pad of this third aspect in the manner noted above in relation to the first air bearing pad of the first aspect. Therefore, the various features discussed above in relation to the first aspect may be utilized in this third aspect as well, alone or in any combination.

A fourth aspect of the present invention is embodied by a method for flying a slider relative to an appropriate data storage medium, which will be described herein as a rotating disk. Other data storage mediums may be utilized. The slider associated with this fourth aspect includes a first air bearing pad and an appropriate transducer that is formed in or otherwise part of the first air bearing pad. The slider flies above this disk by pressurizing a fluid that exists between the slider and the rotating disk. When a signal is directed to this transducer, the first air bearing pad expands in the direction of its corresponding data storage disk. This expansion (commonly referred to as a "pole tip protrusion") does not have a significant adverse effect on the fly height of the slider. In this regard, the loss in fly height as a signal is being directed to the transducer is no more than about 20 percent of the fly height at a time when a signal is not been directed to the transducer (assuming the same radial position on the rotating disk), and more preferably no more than about 10 percent.

Various refinements exist of the features noted in relation to the fourth aspect of the present invention. Further features may also be incorporated in the fourth aspect of the present invention as well. These refinements and additional features may exist individually or in any combination. One way in which the slider of the fourth aspect may be configured so as to be able to realize the small variation in fly height, regardless of whether a signal is being directed to the transducer or not, is to configure the first air bearing pad of this fourth aspect in the manner noted above in relation to the first air bearing pad of the first aspect. Therefore, the various features discussed above in relation to the first aspect may be utilized in this fourth aspect as well, alone or in any combination.

DETAILED DESCRIPTION OF THE INVENTION

Figure 1:
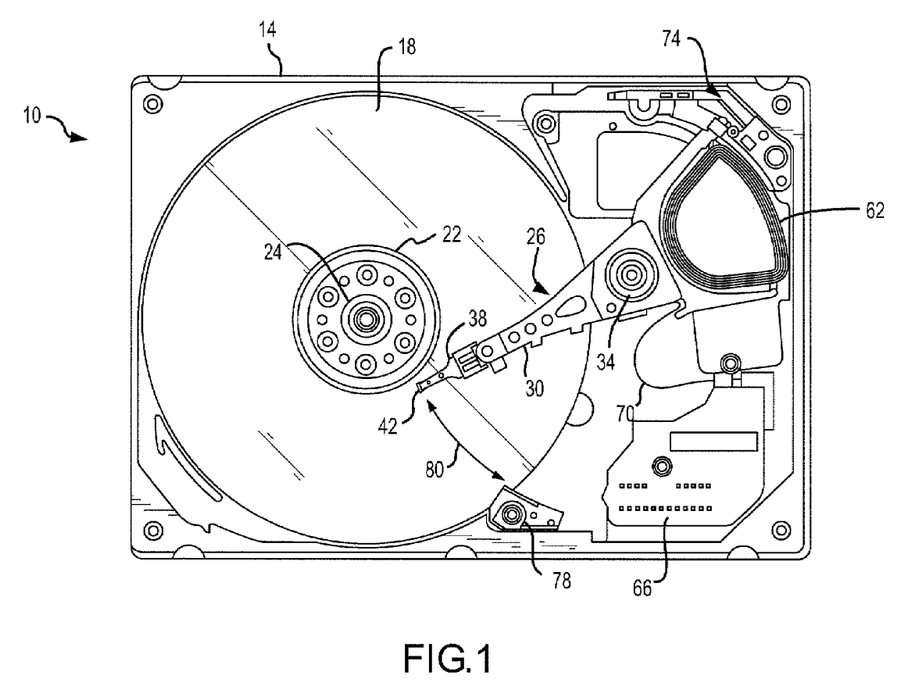
FIG. 1 is a top view of one embodiment of the disk drive.

The present invention will now be described in relation to the accompanying drawings which at least assist in illustrating its various pertinent features. One embodiment of a disk drive 10 is illustrated in FIG. 1. The disk drive 10 generally includes a base plate 14 and a cover (not shown) that may be disposed on the base plate 14 to define an enclosed housing or space for the various disk drive components. The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub or spindle 22, which in turn is rotatably interconnected with the disk drive base plate 14 and/or cover. Multiple data storage disks 18 would be mounted in vertically spaced and parallel relation on the spindle 22. Rotation of the disk(s) 18 is provided by a spindle motor 24 that is coupled to the spindle 22 to simultaneously spin the data storage disk(s) 18 at an appropriate rate.

The disk drive 10 also includes an actuator arm assembly 26 that pivots about a pivot bearing 34, which in turn is rotatably supported by the base plate 14 and/or cover. The actuator arm assembly 26 includes one or more individual rigid actuator arms 30 that extend out from near the pivot bearing 34. Multiple actuator arms 30 would be disposed in vertically spaced relation, with one actuator arm 30 typically being provided for each major data storage surface of each data storage disk 18 of the disk drive 10. Other types of actuator arm assembly configurations could be utilized as well, such as an "E" block having one or more rigid actuator arm tips or the like that cantilever from a common structure. In any case, movement of the actuator arm assembly 26 is provided by an actuator arm drive assembly, such as a voice coil motor 62 or the like. The voice coil motor 62 is a magnetic assembly that controls the operation of the actuator arm assembly 26 under the direction of control electronics 66. Any appropriate actuator arm assembly drive type may be utilized by the disk drive 10, including a linear drive (for the case where the actuator arm assembly 26 is interconnected with the base plate 14 and/or cover for linear movement versus the illustrated pivoting movement about the pivot bearing 34) and other types of rotational drives.

A load beam or suspension 38 is attached to the free end of each actuator arm 30 or actuator arm tip, and cantilevers therefrom. Typically the suspension 38 is biased at least generally toward its corresponding disk 18 by a spring-like force. A slider 42 is disposed at or near the free end of each suspension 38. What is commonly referred to as the "head" (e.g., at least one transducer) is appropriately mounted on the slider 42 and is used in disk drive read/write operations. Various types of read/write technologies may be utilized by the head on the slider 42. The biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head is interconnected with the control electronics 66 of the disk drive 10 by a flex cable 70 that is typically mounted on the actuator arm assembly 26. Signals are exchanged between the head on the slider 42 and its corresponding data storage disk 18 for disk drive read and/or write operations. In this regard, the voice coil motor 62 pivots the actuator arm assembly 26 to simultaneously move each head on its slider 42 along a path 80 and "across" the corresponding data storage disk 18 to position the head at the desired/required radial position on the disk 18 (i.e., at the correct track on the data storage disk 18) for disk drive read/write operations.

When the disk drive 10 is not in operation, the actuator arm assembly 26 is pivoted to a "parked position" to dispose each slider 42 typically at least generally at or beyond a perimeter of its corresponding data storage disk 18, but in any case in vertically spaced relation to its corresponding disk 18. This is commonly referred to in the art as being a dynamic load/unload disk drive configuration. In this regard, the disk drive 10 includes a ramp assembly 78 that is disposed beyond a perimeter of the data storage disk (18) to typically both move the corresponding slider 42 vertically away from its corresponding data storage disk 18 and to also exert somewhat of a retaining force on the actuator arm assembly 26. Any configuration for the ramp assembly 78 that provides the desired "parking" function may be utilized. The disk drive 10 could also be configured to be of the contact start/stop type, where the actuator arm assembly 26 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm assembly 30 in this parked position if the disk drive 10 is exposed to a shock event. In this regard, the disk drive 10 includes an actuator arm assembly latch 74 that moves from a non-latching position to a latching position to engage the actuator arm assembly 26 so as to preclude the same from pivoting in a direction which would tend to drag the slider(s) 42 across their corresponding data storage disk 18.

Figure 2:
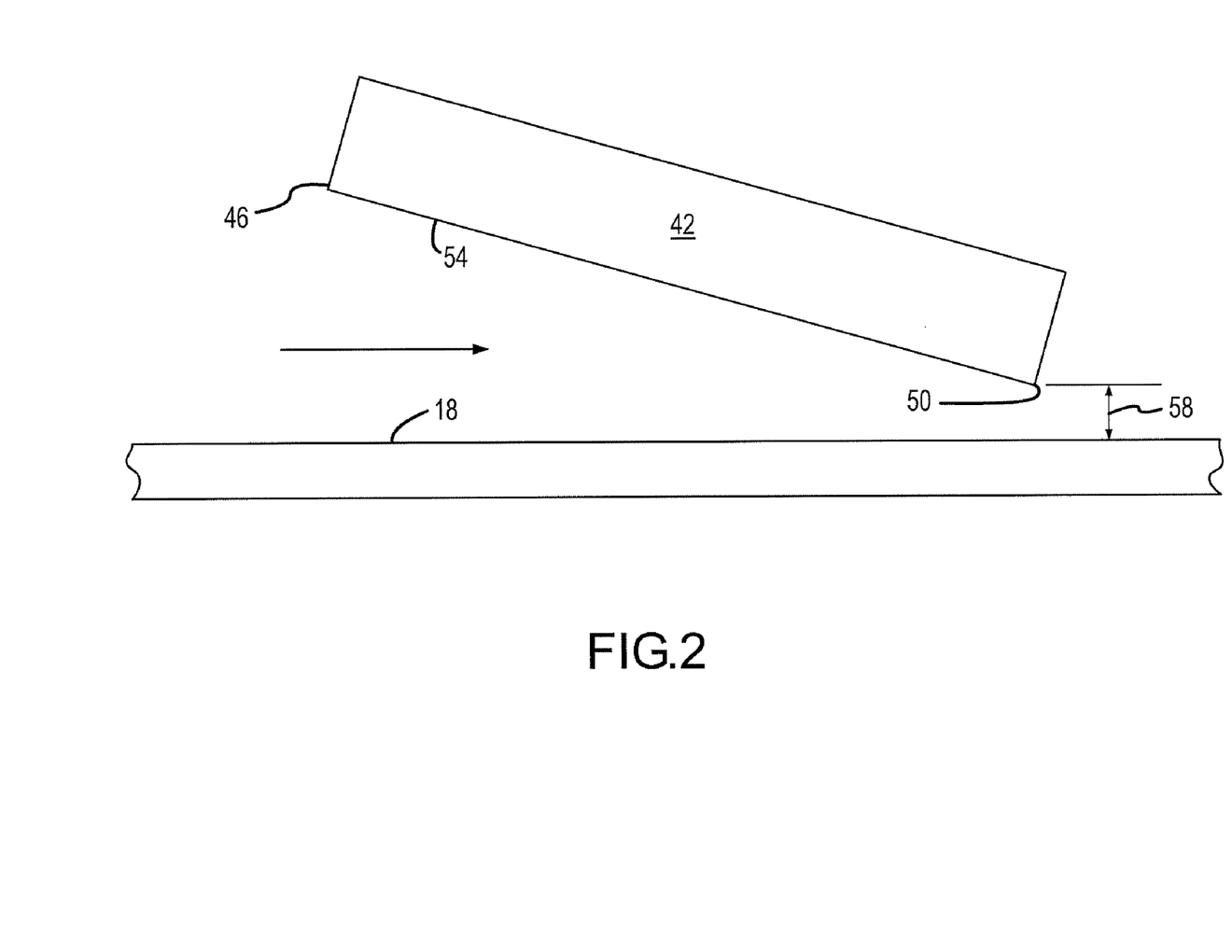
FIG. 2 is an enlarged schematic (in side view) of a flying-type slider used by the disk drive of FIG. 1 during disk drive operations.

The slider 42 of the disk drive 10 may be configured to "fly" on an air bearing during rotation of its corresponding data storage 18 at a sufficient velocity. This is schematically illustrated in FIG. 2. Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 2, the slider 42 is disposed at a pitch angle such that its leading edge 46 of the slider 42 is disposed further from its corresponding data storage disk 18 than its trailing edge 50. The transducer would typically be incorporated on the slider 42 at least generally toward its trailing edge 50 since this is positioned closest to its corresponding disk 18. Other pitch angles could be utilized for flying the slider 42.

Details regarding one embodiment of a slider with an ABS micropad that carries a read/write head is illustrated in FIGS. 3–5B. This slider 82 may be used in place of the slider 42 of FIGS. 1–2. Preferably, the slider 82 utilizes a configuration so as to be able to be formed by conventional semiconductor processing techniques. The slider 82 generally includes a slider body 86 that has a longitudinal extent along a central reference axis 90. Hereafter in relation to the slider 82, the term "longitudinal or the like means in a direction which is along or parallel with this reference axis 90, while the term "lateral" or the like means in a direction that is at least generally "across" this reference axis 90. An at least generally rectangular configuration or profile in plan view is utilized by the slider body 86, although other such configurations or profiles may be appropriate. In this regard, the slider body 86 includes: a leading edge 94 which is laterally extending and disposed at least generally transversely to the airflow carried by its corresponding rotating disk 18; a trailing edge 98 which is also laterally extending (and thereby also disposed at least generally transversely to the airflow carried by the rotating disk 18) and which is longitudinally spaced from the leading edge 94 (i.e., spaced from the leading edge 94 along the reference axis 90); and a pair of sides 102a and 102b which are laterally spaced and extend longitudinally between the leading edge 94 and a trailing edge 98. Orientations for the leading edge 94, the trailing edge 98, and the sides 102a/102b which differ from that illustrated in FIGS. 3–4 may be appropriate.

Figure 3:
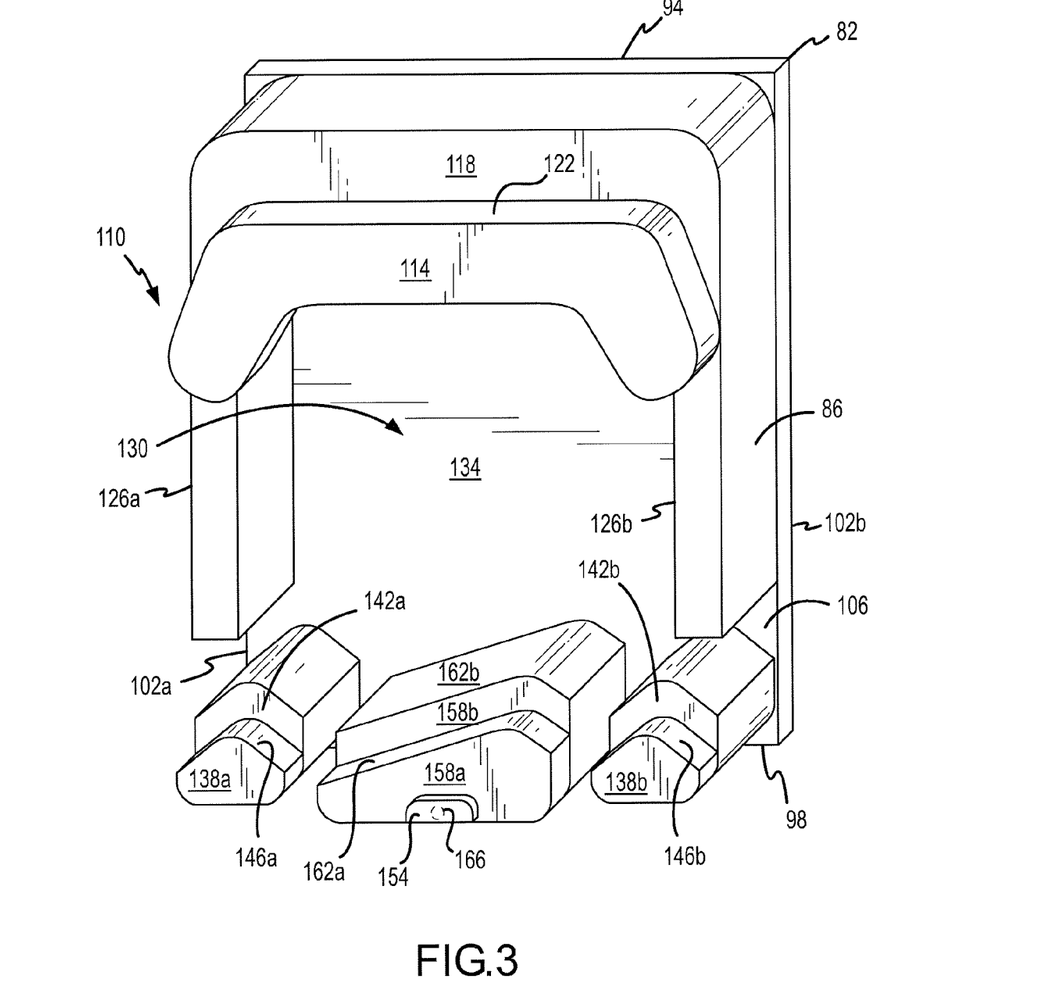
FIG. 3 is a perspective view of one embodiment of a slider that may be used by the disk drive of FIG. 1.
Figure 4:
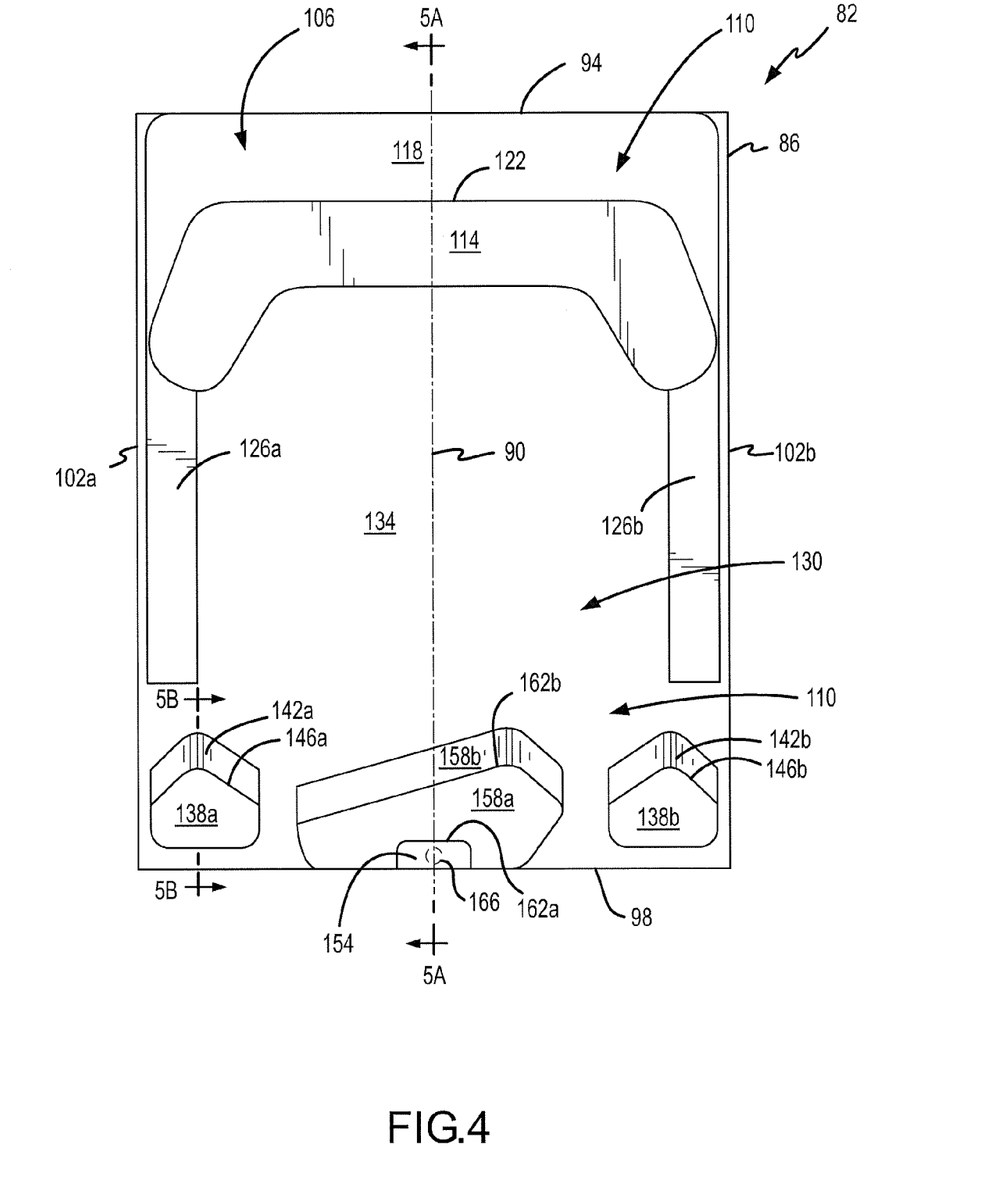
FIG. 4 is a bottom view of the slider of FIG. 3.

The slider body 86 includes a lower surface 106 that at least generally projects toward its corresponding disk 18 when installed in the disk drive 10 (FIG. 1). Features are incorporated in the design of the lower surface 106 of the slider numeral 82 such that its fly height is less sensitive to temperature changes during read/write operations than prior art sliders. Generally, the lower surface 106 of the slider body numeral 86 includes an ABS (air bearing surface) system 110. Each surface of the ABS system 110 is a continuous surface in that there are no cavities formed on any of these surfaces, nor are there any "through holes" or the like that extend through any of these surfaces, both of which would tend to adversely affect the airflow characteristics and thereby the fly height.

Air that is carried by the rotating disk 18 during disk drive operations is pressurized by the ABS system 110 in a desired manner so as to exert a "lifting" force on the slider body 86, or one that is directed at least generally away from the corresponding data storage disk 18. As will be discussed in more detail below, a high pressure in the case of the slider 82 is exerted on a small air bearing surface of the ABS system 110. This small air bearing surface is part of a small air bearing pad that contains a read/write head 166. As such, the tendency of the small ABS pad having the read/write head 166 to protrude in the direction of its corresponding disk 18 as a signal is being directed to/from the head 166 has a reduced adverse effect on the fly height of the slider 82 in comparison to prior art slider designs. That is, since this now protruded portion of the ABS system 110 is a principal contributor to the total lift force that is exerted on the slider body 86 during disk drive operations, there is no significant loss in fly height as a result of the protruding action. As such, the fly height of the slider 82 is not significantly affected to an undesired degree by what is commonly referred to in the art as "pole tip protrusion."

The ABS system 110 of the slider 82 generally includes a front ABS pad 114 that is a continuous surface, that is horizontally disposed, that is disposed at least generally toward the leading edge 94 of the slider 82, and that has a leading portion that is at least generally laterally extending. In one embodiment, the front ABS pad 114 is disposed a distance $d_8$ (FIG. 5A) that is within a range of about 0.005 inch to about 0.02 inch from the leading edge 94. Pressurization of the air carried by the rotating disk 18 is provided by a front ABS step 118 that is disposed immediately in front of the front ABS pad 114 in the direction of the leading edge 94. This front ABS step 118 is recessed relative to the front ABS pad 114 by an at least generally vertically disposed riser 122. The front ABS step 118 is also horizontally disposed and is a continuous surface as well. Other ways of pressurizing the front ABS pad 114 could be utilized.

A pair of laterally spaced side rails 126a, 126b extend toward, but not to, the trailing edge 98 of the slider 82. In one embodiment, these rails 126a, 126b are disposed at the same elevation as the front ABS step 118, although such need not necessarily be the case. Disposed behind the front ABS pad 114 and between the pair of side rails 126a, 126b is a negative pressure or "suction" cavity 130. A base 134 of the cavity 130 is significantly recessed in relation to both the front ABS pad 114 and the side rails 126a, 126b. As such, air that flows over the front ABS pad 114 flows over the cavity 130 in such a manner so as to generate a negative pressure therein which may be used to have an effect upon and/or control the flight of the slider 82 (i.e., and so as to exert a force on the slider 82 that is at least generally opposed to the lifting forces that are exerted on the slider body 86 by the ABS system 110, such that the negative pressure will tend to move the slider 82 toward its corresponding disk 18). The base 134 of the cavity 130 is recessed relative to the ABS system 110 by a sufficient amount so as to allow the noted negative pressure to be generated therein. This negative pressure region is laterally confined by the side rails 126a, 126b. Other configurations may be utilized for the side rails 126a, 126 and/or the front ABS pad 114 for purposes of defining the negative pressure or suction cavity 130.

The ABS system 110 for the slider 82 further includes a pair of rear ABS pads 138a, 138b that are both a continuous surface, that are both horizontally disposed, that are disposed at least generally toward the trailing edge 98 of the slider body 86, and that are at least generally proximate to the sides 102a, 102b, respectively, of the slider body 86. In one embodiment, the trailing edge of each of the rear ABS pads 138a, 138b is disposed a distance $d_9$ that is within about 0.002 inch of the trailing edge 98 (and thereby encompassing being disposed at the trailing edge 98). Moreover, in one embodiment the rear ABS pads 138a, 138b are disposed equidistantly from the reference axis 90, although such need not be the case.

Pressurization of the air carried by the rotating disk 18 is provided by a pair of rear ABS steps 142a, 142b that are both a continuous surface, that are both horizontally disposed, and further that are disposed immediately in front of their corresponding rear ABS pad 138a, 138b, respectively, in the direction of the leading edge 94. Each rear ABS step 142a, 142b is recessed relative to its corresponding rear ABS pad 138a, 138b by an at least generally vertically disposed riser 146a, 146b. Other ways of pressurizing the rear ABS pads 138a, 138b could be utilized. Generally, these rear ABS pads 138a, 138b may be used to enhance the roll stiffness of the slider 82 as it flies over its corresponding data storage disk 18. There may be instances where the rear ABS pads 138a, 138b are not disposed the same distance from the axis 90 as noted above, where they are not disposed the same distance from the trailing edge 98, or both. Moreover, in some instances there may be only one such rear ABS pad 138, while in yet other instances there may not be any rear ABS pad 138 (neither alternative being shown).

The front ABS pad 114 and the rear ABS pads 138a, 138b both contribute to the total lifting forces that are exerted on the slider body 86 during disk drive operations. Another substantial contributor to the total lifting forces that are exerted on the slider body 86 is provided by an ABS pad 154 that is also a continuous surface, that is also horizontally disposed, and that carries the read/write head 166. Therefore, the ABS pad 154 will hereafter be referred to as a "transducer ABS pad 154." The transducer ABS pad 154 is disposed at least generally toward the trailing edge 98 of the slider body 86. In one embodiment, the trailing edge of the transducer ABS pad 154 is disposed within about 0.0005 inches of the trailing edge 98 (and thereby encompassing being disposed at the trailing edge 98 as shown in the illustrated embodiment), while in another embodiment the trailing edge of the transducer ABS pad 154 is disposed within about 0.001 inches of the trailing edge 98, while in yet another embodiment the trailing edge of the transducer ABS pad 154 is disposed within about 0.002 inches of the trailing edge 98. In one embodiment, the entirety of the transducer ABS pad 154 is disposed within about 0.002 inches of the trailing edge 98, while in another embodiment the entirety of the transducer ABS pad 154 is disposed within about 0.02 of the length of the slider body 86. Although the transducer ABS pad 154 is illustrated as being disposed on the reference axis 90 and symmetrically relative thereto in the lateral dimension, such need not be the case. That is, the transducer ABS pad 154 could be disposed in non-symmetrical relation to the center reference axis 90 (e.g., off to one side of the axis 90).

A read/write head 166 is mounted on the slider 82 within the transducer ABS pad 154 as noted. That is, the head 166 is embedded within the transducer ABS pad 154, as indicated by the dashed line for the head 166 in FIGS. 3–4. Generally, the size of the transducer ABS pad 154 is selected such that at least a substantial portion of the transducer ABS pad 154, and more preferably the entirety of the transducer ABS pad 154, protrudes toward the disk 18 during read/write operations (or while the head 166 is otherwise involved in some "signaling" operation). As will be discussed in more detail below, configuring the transducer ABS pad 154 in this manner reduces the effect of read/write operations on the fly height of the slider 82. Based upon the foregoing, the transducer ABS pad 154 will typically have a very small surface area. In one embodiment, the surface area of the transducer ABS pad 154 (more specifically its air bearing surface) is no more than 0.00001 in$^2$. Another way to characterize the size of the transducer ABS pad 154 is that the ratio of the surface area of the transducer ABS pad 154 (more specifically the area of the corresponding air bearing surface) to an area bounded by the leading edge 94, the trailing edge 98, and the sides 102a, 102b of the slider body 86 is no more than about 0.004 in one embodiment, and more preferably no more than about 0.002 in another embodiment. Stated another way, a ratio of the surface area of the transducer ABS pad 154 to the area encompassed by a projection of the lower surface 106 of the slider body 86 onto a reference plane is within the above-noted limits.

Pressurization of the air carried by the rotating disk 18 is provided by a first transducer ABS step 158a that is disposed immediately in front of the transducer ABS pad 154 in the direction of the leading edge 94 and that is horizontally disposed, and by a second transducer ABS step 158b that is disposed immediately in front of the first transducer ABS step 158a in the direction of the leading edge 94 and that is also horizontally disposed. Both the first and second transducer ABS steps 158a, 158b are continuous surfaces. The first transducer ABS step 158a is recessed relative to the transducer ABS pad 154 by an at least generally vertically disposed riser 162a, while the second transducer ABS step 158b is recessed relative to the first transducer ABS step 158a by an at least generally vertically disposed riser 162b. Other ways of pressurizing the transducer ABS pad 154 could be utilized. In one embodiment, the first transducer ABS step 158a is disposed at the same elevation as each of the rear ABS pads 138a, 138b and is itself an air bearing surface, while the second transducer ABS step 158b is disposed at the same elevation as the rear ABS steps 142a, 142b.

Figure 5A:
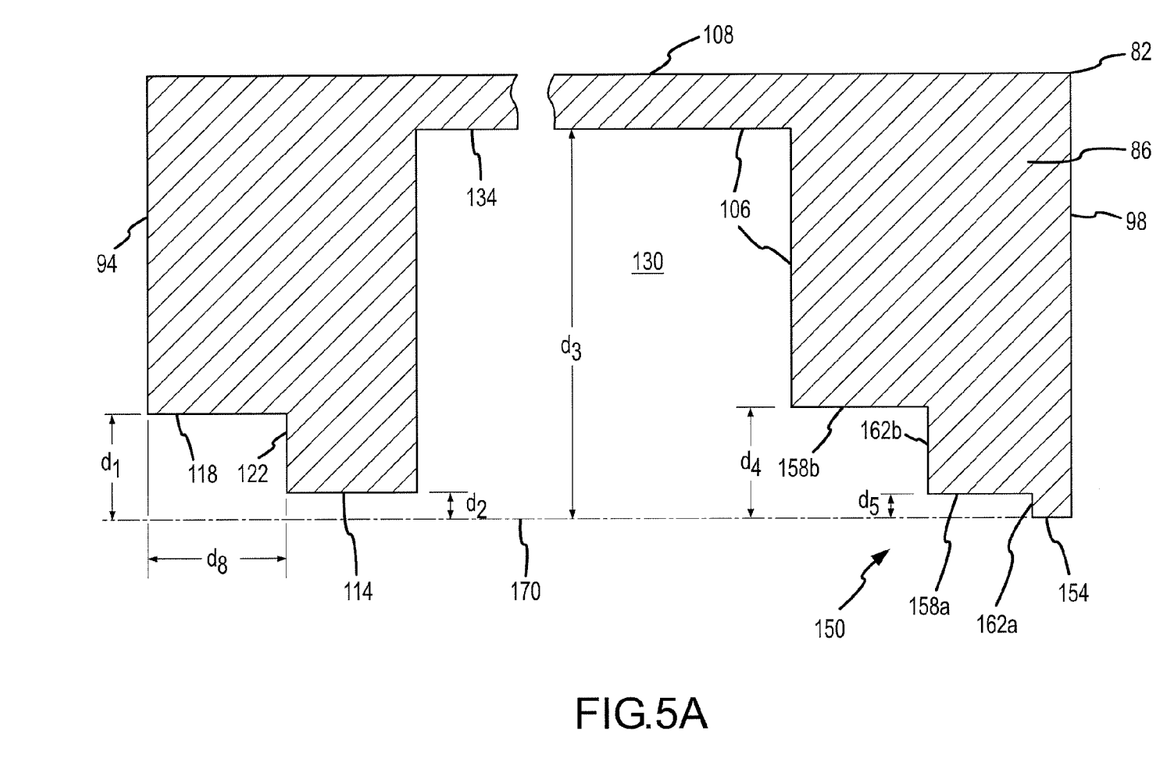
FIG. 5A is a cross-sectional view of the slider of FIG. 4 take along line 5A—5A.
Figure 5B:
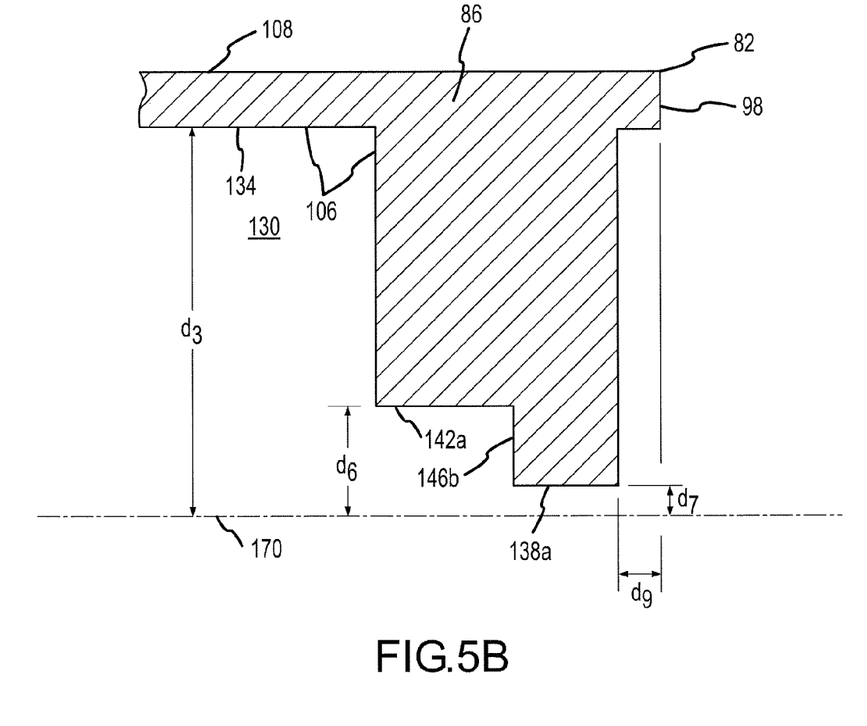
FIG. 5B is a cross-sectional view of the slider of FIG. 4 take along line 5B—5B.

FIGS. 5A and 5B illustrate and summarize the above-noted relative positions of features on the lower surface 106 of the slider body 58. These features are described in relation to a reference plane 170 that contains the transducer ABS pad 154 and prior to installing the slider 82 in the disk drive 10 (e.g., not during read/write operations). Generally: 1) the front ABS step 118 is disposed a distance $d_1$ from the reference plane 170; 2) the front ABS pad 114 is disposed a distance $d_2$ from the reference plane 170; 3) the base 134 of the cavity 130 is disposed a distance $d_3$ from the reference plane 170; 4) the second transducer ABS step 158b is disposed a distance $d_4$ from the reference plane 170; 5) the first transducer ABS step 158a is disposed a distance $d_5$ from the reference plane 170; 6) the transducer ABS pad 154 is coplanar with the reference plane 170; 7) the rear ABS steps 142a, 142b are disposed a distance $d_6$ from the reference plane 170; and 8) the rear ABS pads 138a, 138b are disposed a distance $d_7$ from the reference plane 170. In one embodiment: 1) the distance $d_1$ is equal to the distance $d_4$; 2) the distance $d_2$ is equal to the distance $d_5$; 3) the distance $d_6$ is equal to the distance $d_4$; and 4) the distance $d_7$ is equal to the distance $d_5$. In one embodiment and for the case where the slider body has a 0.049 inch length and a 0.039 inch width: 1) the distance $d_1$ is within a range of about 3 microinches to about 8 microinches; 2) the distance $d_2$ is within a range of about 0 to about 3 microinches; 3) the distance $d_3$ is within a range of about 40 microinches to about 100 microinches; 4) the distance $d_4$ is within a range of about 3 microinches to about 8 microinches; 5) the distance $d_5$ is within a range of about 0.5 microinches to about 3 microinches; 6) the distance $d_6$ is within a range of about 3 microinches to about 8 microinches; and 7) the distance $d_7$ is within a range of about 0.5 microinches to about 3 microinches. In another embodiment, 1) the distance $d_1$ is about 5 microinches; 2) the distance $d_2$ is about 0 microinches; 3) the distance $d_3$ is about 50 microinches; 4) the distance $d_4$ is about 5 microinches; 5) the distance $d_5$ is about 1.5 microinches; 6) the distance $d_6$ is about 5 microinches; and 7) the distance $d_7$ is about 1.5 microinches. Notwithstanding the presentation of the foregoing dimensions, it should be appreciated that the general nature of the features that have been described herein in relation to the lower surface 106 of the slider body 86 of the slider are applicable to a variety of sizes for the slider body 86. However, a change in the size of the slider body 86 may of course have an effect on the various dimensions, pressures, and other characteristics described herein. What is of importance in relation to the design of the lower surface 106 of the slider body 86, and which may be utilized by other slider designs, is that: 1) at least a substantial portion of the transducer ABS pad 154, and more preferably the entirety thereof, protrudes toward the disk 18 during read/write operations due to the temperature increase caused by the head 166 embedded therein; and 2) a sufficiently high pressure is exerted on an appropriately sized transducer ABS pad 154 so as to generate sufficient lift forces on the transducer ABS pad 154 to compensate for pole tip protrusion in the manner described herein.

Figure 6:
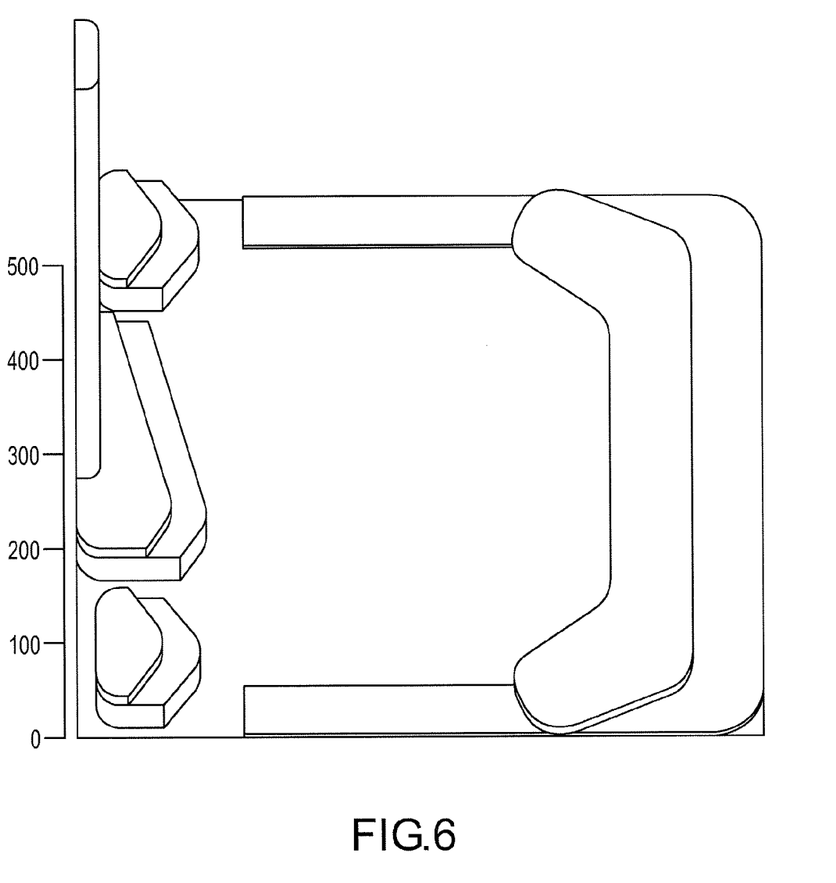
FIG. 6 is a three-dimensional representation of the pressure distribution on the slider of FIG. 3.

Since the rear transducer ABS pad 154 protrudes furthest on the lower surface 106 of the slider body 106 (disposed further from an upper surface 108 of the slider body 86), since it is disposed at or close to the trailing edge 98, and since it has such a small surface area, significantly higher pressures are exerted on the transducer ABS pad 154 than any other portion of the lower surface 106 of the slider body 86. In one embodiment, the maximum pressure that is exerted on the transducer ABS pad 154 is at least about 10 times greater than the pressure that is exerted on any other portion of the lower surface 106 of the slider body 86 during the flight of the slider 82. In another embodiment, at least about 15 percent of the total lifting force that is exerted on the lower surface 106 of the slider body 86 during the flight of the slider 82 is applied against the transducer ABS pad 154. Pressures of at least about 400 psi in one embodiment, and pressures of about 500 psi in another embodiment, may be exerted on the transducer ABS pad 154 during the flight of the slider 82. This phenomena is graphically represented in FIG. 6, which shows the pressure distribution across the ABS system 110 on the lower surface 106 of the slider body 86 during the flight of the slider 82 when a 3½ inch disk 18 is rotated at a velocity of about 5,400 RPM, and during non-read/write operations. Generally, and with the slider 82 flying at a pitch angle such that its leading edge 94 is disposed further from its corresponding data storage disk 18 than the trailing edge 98 (at least generally similar to the FIG. 2 configuration), FIG. 6 illustrates that: 1) the average pressure exerted on the front ABS pad 114 is at least slightly less than the average pressure exerted on each of the rear ABS pads 138a, 138b (e.g., at least about 10% less); 2) the pressure exerted on each of the rear ABS pads 138a, 138b is significantly less than the pressure exerted on the transducer ABS pad 154 (e.g., at least about 10 times less); and 3) the pressure exerted on the first transducer ABS step 158a is about substantially the same as the pressure exerted on each of the rear ABS pads 138a, 138b.

Figure 7:
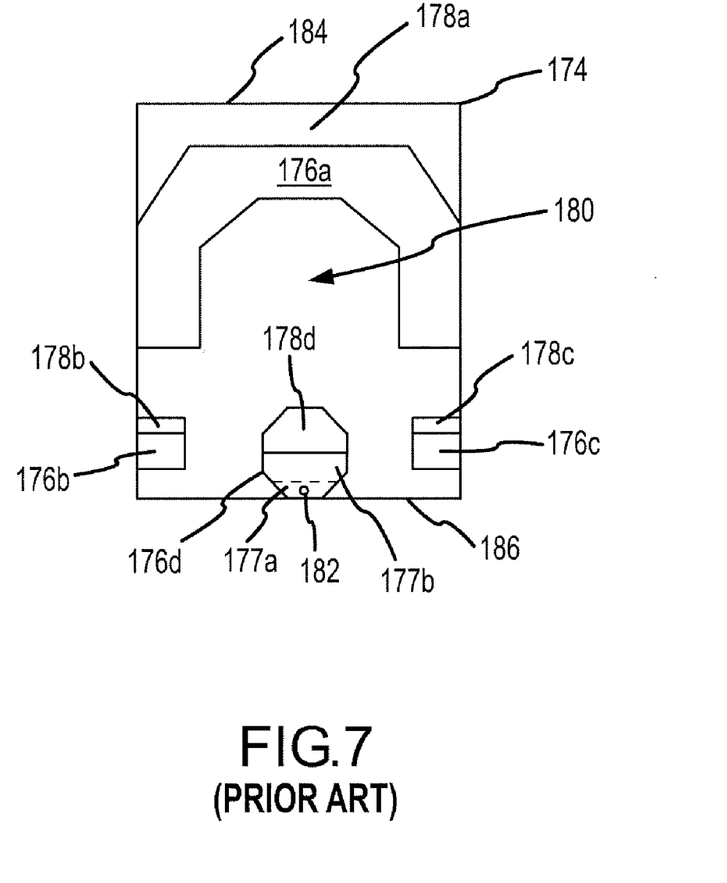
FIG. 7 is a bottom view of one embodiment of a prior art slider.

As noted above, the read/write head 166 is contained within the transducer ABS pad 154. Expansion of the transducer ABS pad 154 further from the upper surface 108 of the slider body 86 during read/write operations (i.e., as a signal is being provided to/sent from the read/write head 166) does not have a significant adverse effect on the fly height of the slider 82, mainly because prior to any such expansion, the transducer ABS pad 154 is a primary contributor to the total lifting force being exerted on the slider body 86, since the size of the transducer ABS pad 154 is selected such that at least a substantial portion of the transducer ABS pad 154, and more preferably the entirety of the transducer ABS pad 154, protrudes toward the disk 18 during read/write operations (or while the head 166 is otherwise involved in some "signaling" operation), since the transducer pad 154 is highly pressurized, and since the transducer pad 154 is still large enough such that the high pressure to which the transducer pad 154 is exposed generates sufficient lift to adequately compensate for pole tip protrusion. That is, since the transducer ABS pad 154 defines an air bearing surface, and since at least a substantial portion of this air bearing surface will protrude toward the disk 18 during read/write operations due to the temperature increase of the pad 154 caused by the embedded head 166, the loss in fly height due to pole tip protrusion is significantly less compared to the case where the head is mounted within an air bearing pad that is sized such that only part of the air bearing pad extends toward the disk during read/write operations. The second instance would be the case for the prior art slider 174 that is depicted in FIG. 7. Generally, the slider 174 includes: 1) a front ABS pad 176a with a front ABS step 178a that is disposed in front thereof in the direction of its leading edge 184, and that is recessed relative to the front ABS pad 176a (e.g., about 5 microinches); 2) a pair of first rear ABS pads 176b, 176c with a first rear ABS step 178b, 178c disposed in front thereof in the direction of its leading edge 184, and that is recessed relative to its corresponding first rear ABS pad 176b, 176c (e.g., about 5 microinches); 3) a centrally disposed second rear ABS pad 176d with a second rear ABS step 178d that is disposed in front thereof in the direction of its leading edge 184, and that is recessed relative to the second ABS pad 176d (e.g., about 5 microinches); 4) and a read/write head 182 that is embedded in an aft portion (in the direction of a trailing edge 186 of the slider 174) 177a of the second rear ABS pad 176d and that is coplanar with the remainder 177b of the second rear ABS pad 176d when no signal is being applied to/sent from the read/write head 182.

Figure 8:
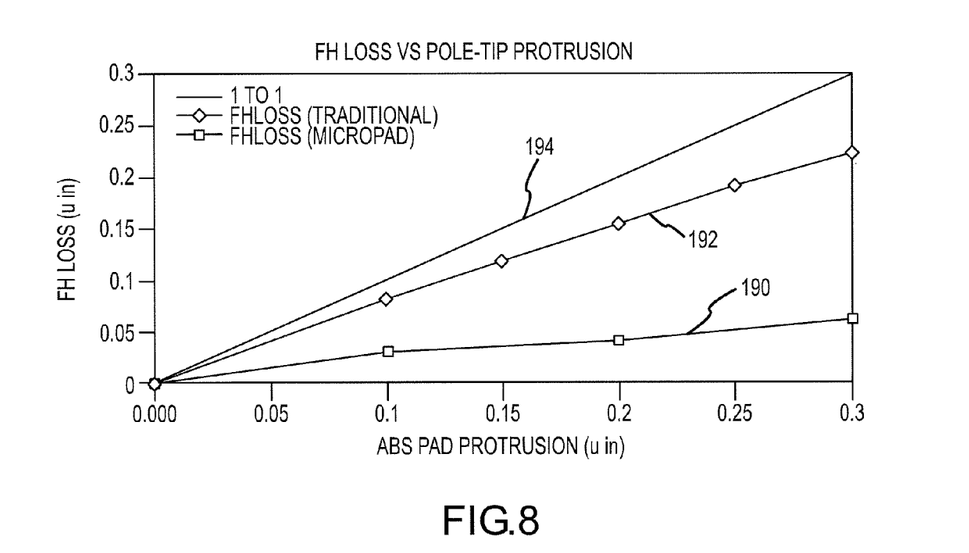
FIG. 8 is a comparison between the slider of FIG. 3 and the prior art slider of FIG. 7 in relation to the effect of pole tip protrusion on fly height.

FIG. 8 compares the performance of the slider 82 of FIG. 3 (plot 190) to the slider 174 of FIG. 7 (plot 192) during a read/write operation in relation to fly height. Plot 194 is provided for reference purposes, and is a one-for-one relationship between pole-tip protrusion and fly height loss. The amount of pole-tip protrusion is presented on the x axis, while the loss in fly height is presented on the y axis. Generally, FIG. 8 indicates that the expansion of the transducer ABS pad 154 of the slider 82 (again which contains the read/write head 166 and which experiences a significantly higher pressure than other portions of the ABS system 110) during read/write operations has a significantly less adverse effect on the fly height of the slider 82 than does the expansion of the read/write head 182 of the slider 174 on the fly height of the slider 174. What happens during read/write operations is that the read/write head 182 of the slider 174 and a corresponding aft portion 177a of the ABS pad 176d, but not a forward portion 177b of the ABS pad 176d that was originally coplanar therewith, expands in the direction of the corresponding data storage disk. This causes a more significant reduction in the fly height of the slider 174 in comparison to the slider 82 because the main lifting pressure for the slider 174 is distributed over a larger ABS pad 176d, most of which does not thermally expand and continues to fly at the same height. In effect, the read/write head 182 and a corresponding portion 177a of the ABS pad 176 protrude downward from the remainder 177b of the ABS pad 176d during read/write operations, while this remainder 177b of the ABS pad 176 does not undergo any significant amount of protrusion. Therefore, there is a reduced spacing between the disk and the portion 177a of the ABS pad 176 that expanded along with the read/write head 182. On the other hand, when the read/write head 166 in the transducer ABS pad 154 of the slider 82 thermally expands and protrudes downward toward the disk 18, at least a substantial portion of the transducer ABS pad 154 protrudes toward the disk 18. Due to the high lifting pressure that is being exerted on the transducer ABS pad 154 (which is actually increased by the protruding action of the transducer ABS pad 154 since the offset between the transducer ABS pad 154 and the first pressurizing step 158a is increased by this protruding action of the transducer ABS pad 154 (e.g., the distance $d_7$ may change from about 1.5 microinches to about 1.6 microinches when a read/write operation is initiated)), this exerts a lifting force on the rest of slider 82 and keeps the fly height of head 166 more constant than in the case of the slider 174. Therefore, another way to characterize the slider 82 is that it experiences less than about a 50% of protrusion height reduction in fly height during read/write operations. Another way to characterize the slider 82 is that it experiences no more than about a 20% loss, and more preferably no more than about a 10% loss, in fly height during read/write operations in comparison to those times when read/write operations are not taking place.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for flying a slider relative to a data storage medium, said slider comprising a first air bearing pad and a transducer, said method comprising the step of:
    flying said slider above said data storage medium, wherein said flying step comprises pressurizing a fluid between said first air bearing pad and said data storage medium so that a pressure that is exerted on at least part of said first air bearing pad is at least about 400 psi; and
    exchanging at least one signal between said transducer and said data storage medium during at least a portion of said flying step.

2. The method, as claimed in claim 1, wherein:
    said pressure that is exerted on at least part of said first air bearing pad is about 500 psi.

3. The method, as claimed in claim 1, wherein:
    said flying step comprises exerting a lifting force on a lower surface of said slider that has said first air bearing pad, wherein a portion of said lifting force that is exerted on said first air bearing pad is at least about 15 percent of a total said lifting force that is exerted on said lower surface of said slider.

4. The method, as claimed in claim 1, wherein:
    said flying step comprises flying said slider at a first fly height above said data storage medium, said exchanging step comprises providing a signal to said transducer, and said method further comprises expanding said first air bearing pad in a direction of said data storage medium from said providing step, wherein said flying step comprises flying said slider at a second fly height after said expanding step, wherein said second fly height is less than said first fly height by no more than about 20 percent of said first fly height.

5. A method for flying a slider relative to a data storage medium, said slider comprising a first air bearing pad and a transducer disposed within said first air bearing pad, said method comprising the steps of:
    executing a first flying step comprising flying said slider at a first fly height above said data storage medium;
    providing a signal to said transducer during said executing the first flying step;
    expanding said first air bearing pad in a direction of said data storage medium during said providing step; and
    executing a second flying step comprising flying said slider at a second fly height after said expanding step, wherein said second fly height is less than said first fly height by no more than about 20 percent of said first fly height.

6. The method, as claimed in claim 5, wherein:
    at least one of said executing a first flying step and said executing a second flying step comprises pressurizing a fluid between said first air bearing pad and said data storage medium so that a pressure that is exerted on at least part of said first air bearing pad is at least about 400 psi.

7. The method, as claimed in claim 6, wherein:
    said pressure that is exerted on at least part of said first air bearing pad is at least about 500 psi.

8. The method, as claimed in claim 5, wherein:
    at least one of said executing a first flying step and said executing a second flying step comprises exerting a lifting force on a lower surface of said slider that has said first air bearing pad, wherein a portion of said lifting force that is exerted on said first air bearing pad is at least about 15 percent of a total said lifting force that is exerted on said lower surface of said slider.

* * * * *